(12) United States Patent
Doui

(10) Patent No.: US 10,760,505 B2
(45) Date of Patent: Sep. 1, 2020

(54) ENGINE DEVICE

(71) Applicant: Yanmar Co., Ltd., Osaka-shi, Osaka-fu (JP)

(72) Inventor: Masayoshi Doui, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/330,232

(22) PCT Filed: Jun. 16, 2017

(86) PCT No.: PCT/JP2017/022382
§ 371 (c)(1),
(2) Date: Mar. 4, 2019

(87) PCT Pub. No.: WO2018/042828
PCT Pub. Date: Mar. 8, 2018

(65) Prior Publication Data
US 2019/0211755 A1    Jul. 11, 2019

(30) Foreign Application Priority Data

Sep. 5, 2016   (JP) .................................. 2016-172837

(51) Int. Cl.
*F02D 19/06* (2006.01)
*F02D 19/10* (2006.01)
(Continued)

(52) U.S. Cl.
CPC ..... *F02D 19/0623* (2013.01); *F02D 19/0615* (2013.01); *F02D 19/0642* (2013.01);
(Continued)

(58) Field of Classification Search
CPC ............... F02D 19/0623; F02D 41/221; F02D 19/0647; F02D 35/023; F02D 19/10;
(Continued)

(56) References Cited

U.S. PATENT DOCUMENTS 5,038,744 A * 8/1991 Martin .................... F02P 9/002
                                                         123/625
5,387,253 A * 2/1995 Remboski, Jr. ........ G01M 15/11
                                                         73/114.05
(Continued)

FOREIGN PATENT DOCUMENTS

JP    2003-262139 A    9/2003
JP    2005-330945 A    12/2005
(Continued)

OTHER PUBLICATIONS

International Search Report dated Sep. 12, 2017 issued in corresponding PCT Application PCT/JP2017/022382 cites the patent documents above.

(Continued)

*Primary Examiner* — Joseph J Dallo
(74) *Attorney, Agent, or Firm* — Norton Rose Fulbright US LLP

(57) ABSTRACT

An engine device including an engine capable of coping with both a premix combustion mode in which premixed fuel obtained by mixing fuel with air in advance is supplied into a cylinder and combusted and a diffusion combustion mode in which liquid fuel is injected into the cylinder and combusted. The engine device further includes a gas supply device configured to supply the gaseous fuel into the cylinder in the premix combustion mode; a pilot injection device configured to inject the liquid fuel into the cylinder in the premix combustion mode; and a main injection device configured to inject the liquid fuel into the cylinder in the diffusion combustion mode. The liquid fuel is injected from the main injection device and the liquid fuel is injected from the pilot injection device during the diffusion combustion mode, thus diagnosing failure in the pilot injection device.

20 Claims, 10 Drawing Sheets

(51) Int. Cl.
*F02D 35/02* (2006.01)
*F02D 41/22* (2006.01)
*F02D 41/00* (2006.01)
*F02D 41/30* (2006.01)
*F02D 41/40* (2006.01)
*F02D 41/38* (2006.01)

(52) U.S. Cl.
CPC ......... *F02D 19/0647* (2013.01); *F02D 19/10* (2013.01); *F02D 35/023* (2013.01); *F02D 41/0027* (2013.01); *F02D 41/22* (2013.01); *F02D 41/221* (2013.01); *F02D 41/3017* (2013.01); *F02D 41/403* (2013.01); *F02D 19/0689* (2013.01); *F02D 19/0692* (2013.01); *F02D 2041/389* (2013.01); *Y02T 10/36* (2013.01); *Y02T 10/40* (2013.01)

(58) Field of Classification Search
CPC ............... F02D 41/403; F02D 41/3017; F02D 41/0027; F02D 19/0642; F02D 19/0615; F02D 41/22; F02D 19/0692; F02D 19/0689; F02D 2041/389; F02D 41/02; F02D 19/082; Y02T 10/40; Y02T 10/36
See application file for complete search history.

(56) References Cited

U.S. PATENT DOCUMENTS

| | | | | |
|---|---|---|---|---|
| 5,492,007 | A * | 2/1996 | Noble | F02P 17/12 324/393 |
| 5,559,285 | A * | 9/1996 | Bryant | G01M 15/106 123/406.27 |
| 5,600,070 | A * | 2/1997 | Wlodarczyk | G01L 9/0077 73/715 |
| 5,666,923 | A * | 9/1997 | Collier, Jr. | C10L 3/06 123/488 |
| 5,763,769 | A * | 6/1998 | Kluzner | G01L 23/221 73/114.09 |
| 5,787,864 | A * | 8/1998 | Collier, Jr. | F02M 21/0215 123/436 |
| 5,831,263 | A * | 11/1998 | Komachiya | F02D 35/023 250/227.17 |
| 5,935,189 | A * | 8/1999 | Park | G01M 15/11 701/111 |
| 6,494,087 | B2 * | 12/2002 | Hatano | G01M 15/11 73/114.02 |
| 7,690,353 | B2 * | 4/2010 | Shafer | F02M 63/0225 123/445 |
| 8,967,502 | B2 * | 3/2015 | Kim | F02D 19/0684 239/585.2 |
| 9,234,452 | B2 * | 1/2016 | Stockner | F02D 19/027 |
| 9,234,472 | B2 * | 1/2016 | Kim | F02D 41/3094 |
| 2002/0007816 | A1 * | 1/2002 | Zur Loye | F02B 1/04 123/295 |
| 2003/0024246 | A1 * | 2/2003 | Beck | F02B 1/12 60/599 |
| 2008/0040014 | A1 * | 2/2008 | Yahata | F01N 3/0222 701/99 |
| 2013/0311066 | A1 * | 11/2013 | Guimaraes | F02D 41/3094 701/104 |
| 2014/0136080 | A1 * | 5/2014 | Sivasubramanian | F02D 19/0623 701/103 |
| 2014/0331970 | A1 * | 11/2014 | Bidner | F02D 19/0642 123/435 |
| 2014/0338645 | A1 * | 11/2014 | Ariie | F02D 19/0613 123/575 |
| 2014/0352801 | A1 * | 12/2014 | McAlister | B60K 15/035 137/312 |
| 2015/0075488 | A1 * | 3/2015 | Touchette | F02D 19/0605 123/299 |
| 2015/0120211 | A1 * | 4/2015 | Michaelis | G01N 33/2829 702/22 |
| 2015/0152804 | A1 * | 6/2015 | Sakayanagi | F02D 41/2416 701/115 |
| 2015/0167573 | A1 * | 6/2015 | Glugla | G01L 23/225 701/104 |
| 2015/0192497 | A1 * | 7/2015 | Gregory | G01M 15/08 73/114.08 |
| 2015/0226642 | A1 * | 8/2015 | Urano | F02D 41/009 73/114.02 |
| 2015/0285710 | A1 * | 10/2015 | Akazaki | G01M 15/08 73/114.16 |
| 2016/0047327 | A1 * | 2/2016 | Suzuki | F02D 41/1497 123/349 |
| 2016/0097366 | A1 * | 4/2016 | Kolhouse | F02P 15/08 123/568.12 |
| 2016/0108857 | A1 * | 4/2016 | Kanafani | F02M 21/06 |
| 2016/0195003 | A1 * | 7/2016 | Konczol | F02M 61/02 123/253 |
| 2016/0195051 | A1 * | 7/2016 | Konczol | F02B 19/1014 123/297 |
| 2016/0281615 | A1 * | 9/2016 | Flynn | F02D 19/0642 |
| 2016/0333781 | A1 * | 11/2016 | Sakayanagi | F02D 35/028 |
| 2017/0107924 | A1 * | 4/2017 | Blythe | F02D 41/0085 |
| 2018/0142629 | A1 * | 5/2018 | Stockner | F02D 29/02 |

FOREIGN PATENT DOCUMENTS

| | | |
|---|---|---|
| JP | 2010-106709 A | 5/2010 |
| JP | 2015-187405 A | 10/2015 |
| JP | 2015-230000 A | 12/2015 |
| KR | 10-2009-0077875 A | 7/2009 |
| KR | 10-2009-0085003 A | 8/2009 |

OTHER PUBLICATIONS

Japanese Office Action dated Aug. 21, 2019 issued in corresponding JP Application 2016-172837 cites the patent document above.
Korean Office Action dated Aug. 22, 2019 issued in corresponding KR Application 10-2018-7031796 cites the patent documents above.

* cited by examiner

ENGINE DEVICE

CROSS REFERENCES TO RELATED APPLICATIONS

This application is a national stage application pursuant to 35 U.S.C. § 371 of International Application No. PCT/JP2017/022382, filed on Jun. 16, 2017 which claims priority under 35 U.S.C. § 119 to Japanese Patent Application No. 2016-172837 filed on Sep. 5, 2016, the disclosures of which are hereby incorporated by reference in their entireties.

TECHNICAL FIELD

The present invention relates to an engine device of a multi-fuel adoptable type for both gaseous fuel such as natural gas and liquid fuels such as heavy oil.

BACKGROUND ART

Traditionally, diesel engines are used as a drive source of vessels such as tankers or transport ships and onshore power generation facilities. However, the exhaust gas of the diesel engine contains a large amount of nitrogen oxide, sulfur oxides, particulate matter, and the like which are harmful substances hindering preservation of the environment. For this reason, in recent years, gas engines that can reduce the amount of harmful substances generated are becoming prevalent as an alternative engine for diesel engines.

A so-called gas engine that generates power by using a fuel gas such as natural gas supplies a mixed gas obtained by mixing a fuel gas with the air to a cylinder and combusts the same (see Patent Literature 1; hereinafter PTL 1). Further, as an engine device combining the characteristics of a diesel engine and characteristics of a gas engine, there is a dual-fuel engine which allows a use of a premix combustion mode in which a mixture of a gaseous fuel (fuel gas) such as natural gas and air is supplied to a combustion chamber and combusted, in combination with a diffusion combustion mode in which a liquid fuel such as crude oil is injected into the combustion chamber and combusted (see patent Literature 2; hereinafter, PTL 2).

CITATION LIST

Patent Literature

PTL 1: Japanese Patent Application Laid-Open No. 2003-262139
PTL 2: Japanese Patent Application Laid-Open No. 2015-187405

SUMMARY OF INVENTION

Technical Problem

A dual-fuel engine described in PTL 2 includes: a gas supply device configured to supply gaseous fuel into a cylinder in a premix combustion mode; a pilot injection device configured to inject liquid fuel into the cylinder in the premix combustion mode; and a main injection device configured to inject the liquid fuel into the cylinder in a diffusion combustion mode. The pilot injection device injects the liquid fuel for ignition during the premix combustion mode. The combustion itself therefore does not take place unless the pilot injection device operates in the premix combustion mode. It is therefore an important technical issue to detect a failure in the pilot injection device.

In view of the current circumstances described above, it is a technical object of the present invention to provide an improved multi-fuel adoptable type engine device.

Solution to Problem

The present invention is an engine device including: an engine capable of coping with both a premix combustion mode in which premixed fuel obtained by mixing gaseous fuel with air in advance is supplied into a cylinder and combusted and a diffusion combustion mode in which liquid fuel is injected into the cylinder and combusted; a gas supply device configured to supply the gaseous fuel into the cylinder in the premix combustion mode; a pilot injection device configured to inject the liquid fuel into the cylinder in the premix combustion mode; and a main injection device configured to inject the liquid fuel into the cylinder in the diffusion combustion mode. The liquid fuel is injected from the main injection device and the liquid fuel is injected from the pilot injection device during the diffusion combustion mode, to diagnose failure in the pilot injection device.

The engine device of the present invention may be such that an injection amount from the pilot injection device is increased at a time of failure diagnosis of the pilot injection device.

Further, the engine device of the present invention may be such that an injection timing of the pilot injection device is advanced at a time of the failure diagnosis.

Further, the engine device of the present invention may be such that the engine device is operated in the diffusion combustion mode without a transition to the premix combustion mode, when failure in the pilot injection device is detected.

Further, the engine device of the present invention may include a plurality of the cylinders, wherein failure in the pilot injection device is diagnosed for each of the cylinders.

Advantageous Effects of Invention

In the engine device of the present invention, the liquid fuel is injected from the main injection device and the liquid fuel is injected from the pilot injection device during the diffusion combustion mode, to diagnose failure in the pilot injection device. Therefore, failure in the pilot injection device can be diagnosed without a separate special component for the failure diagnosis of the pilot injection device.

By configuring the engine device of the present invention so that an injection amount from the pilot injection device is increased at a time of failure diagnosis of the pilot injection device, a maximum in-cylinder pressure increases due to an increase in the amount of liquid fuel injected into the cylinder, while the pilot injection device operates normally, and failure of the pilot injection device can be detected based on a change in the in-cylinder pressure before and after an increase in the injection amount from the pilot injection device.

Further, by configuring the engine device of the present invention so that the injection timing of the pilot injection device is advanced at a time of the failure diagnosis, the maximum in-cylinder pressure easily rises and failure of the pilot injection device can be more reliably diagnosed based on a change in the in-cylinder pressure.

Further, by configuring the engine device of the present invention so that the engine device is operated in the diffusion combustion mode without a transition to the premix combustion mode, when failure in the pilot injection device is detected, shut down of the engine device and a drop in the output caused by the failure of the pilot injection device can be avoided and the engine device can be safely operated.

Further, by configuring the engine device of the present invention with a plurality of the cylinders, so that failure in the pilot injection device is diagnosed for each of the cylinders, which pilot injection device has failed can be identified. This improves the maintenance performance because, for example, replacing only the failed pilot injection device suffices.

DESCRIPTION OF EMBODIMENT

The following description is based on drawings showing an application of an embodiment embodying the present invention to a pair of propulsion/electric power generating mechanisms mounted in a ship having a two-engine two-shaft structure.

Figure 1:
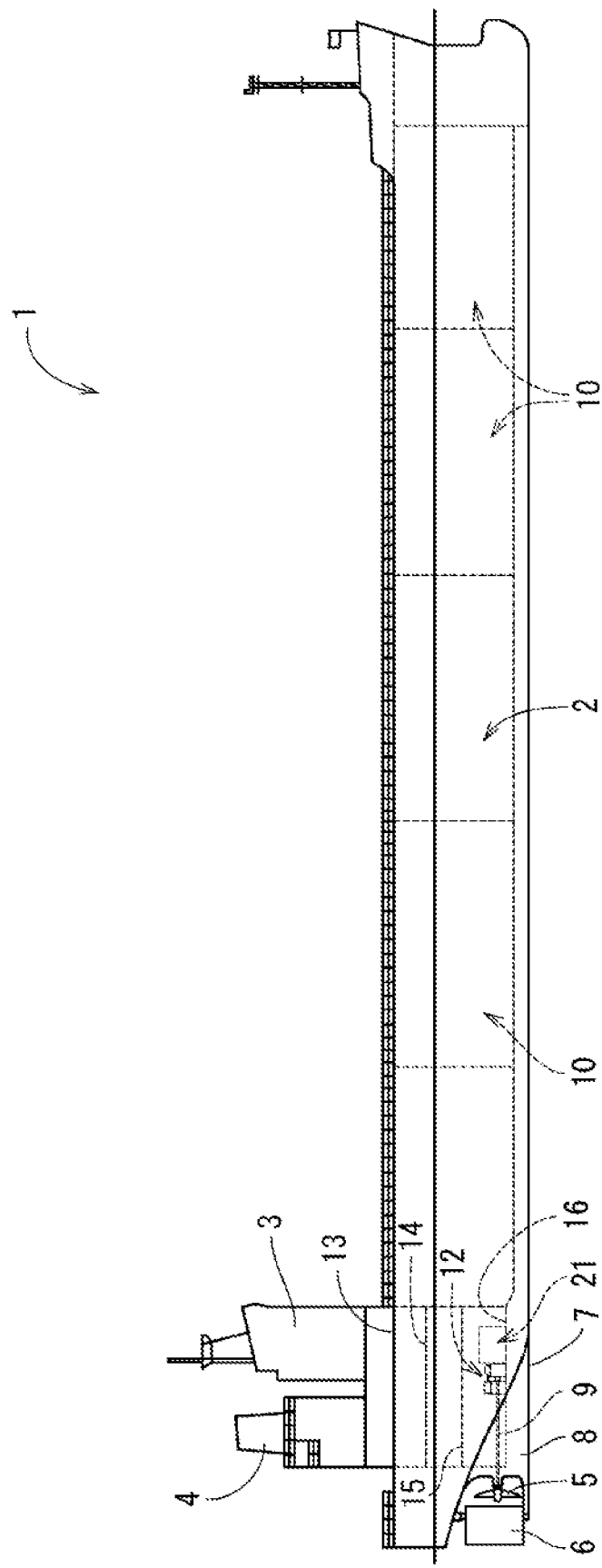
FIG. 1 An overall side view of a ship in an embodiment of the present invention.
Figure 2:
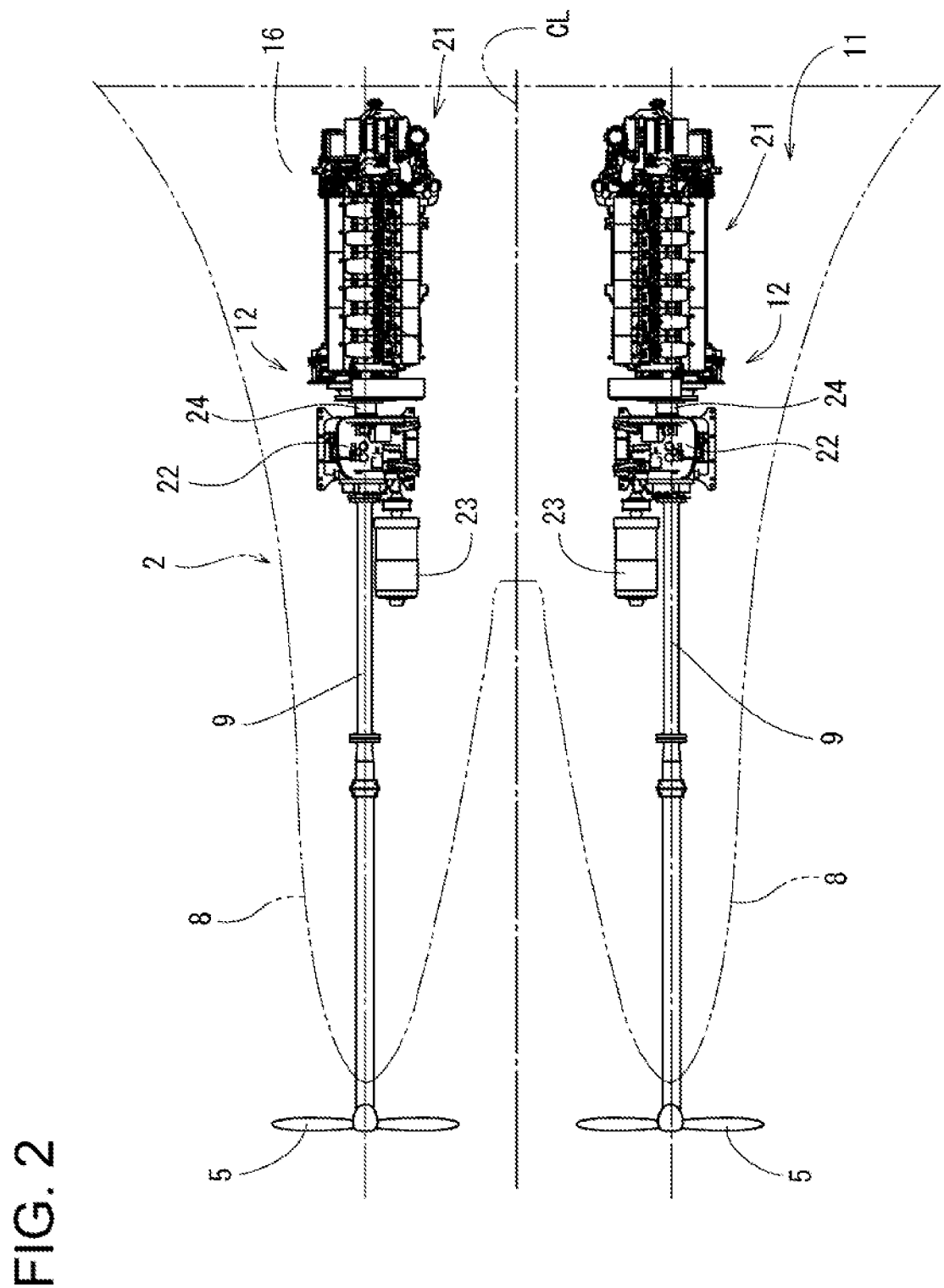
FIG. 2 An explanatory plan view of an engine room.

First, an overview of the ship is described. As shown in FIG. 1 and FIG. 2, the ship 1 of the present embodiment includes: a ship hull 2, a cabin 3 (bridge) provided on the stern side of the ship hull 2; a funnel 4 (chimney) positioned behind the cabin 3; and a pair of propellers 5 and a rudder 6 provided on a lower back portion of the ship hull 2. In this case, a pair of skegs 8 are integrally formed on the ship bottom 7 on the stern side. On each of the skegs 8, a propeller shaft 9 for driving to rotate the propeller 5 is pivotally supported. The skegs 8 are symmetrically formed on the left and right, with respect to the ship hull center line CL (see FIG. 2) which divides the ship hull 2 in its lateral width direction. That is, this embodiment adopts a twin skeg as the stern shape of the ship hull 2.

On a bow side and a middle part of the ship hull 2, a hold 10 is provided. On the stern side of the ship hull 2, an engine room 11 is provided. In the engine room 11, a pair of propulsion/electric power generating mechanisms 12 each serving as a drive source for the propeller 5 and as an electric power supply of the ship 1 is positioned on the left and right across the ship hull center line CL. The rotary power transmitted from each propulsion/electric power generating mechanism 12 to the propeller shaft 9 drives and rotates the propeller 5. The inside of the engine room 11 is parted relative to the up and down directions by an upper deck 13, a second deck 14, a third deck 15, and an inner bottom plate 16. The propulsion/electric power generating mechanisms 12 of this embodiment are installed on the inner bottom plate 16 at the lowermost stage of the engine room 11. The hold 10 is divided into a plurality of compartments, though not shown in detail.

As shown in FIG. 2, each propulsion/electric power generating mechanism 12 is a combination of: an engine device 21 (dual-fuel engine, in the embodiment) which serves as a drive source of the propeller 5; a speed reducer 22 configured to transmit power of the engine device 21 to the propeller shaft 9; and a shaft-driven generator 23 which generates electric power by the power of the engine device 21. In this connection, a "low-speed" engine drives at a rotational speed of 500 times or less per minute, a "medium-speed" engine drives at a rotational speed of 500 to 1000 times per minute, and a "high-speed" engine drives at a rotational speed of 1000 times or more per minute. The engine device 21 of the embodiment is configured to drive at a constant speed within a range of medium-speed (approximately 700 to 750 times per minute).

An engine output shaft 24 extends in the front/rear length direction of the ship hull 2. That is, the engine device 21 is arranged in the engine room 11 with the direction of the engine output shaft 24 directed in the front/rear length direction of the ship hull 2. The speed reducer 22 and the shaft-driven generator 23 are disposed on the stern side of the engine device 21. From the rear surface side of the engine device 21, a rear end side of the engine output shaft 24 protrudes. On the rear end side of the engine output shaft 24, the speed reducer 22 is coupled in such a manner as to be capable of transmitting power. The shaft-driven generator 23 is arranged on the side opposite to the engine device 21 across the speed reducer 22. The engine device 21, the speed reducer 22, and the shaft-driven generator 23 are aligned in this order from the front of the engine room 11. In this case, the speed reducer 22 and the shaft-driven generator 23 are arranged in or nearby the skegs 8 on the stern side. Therefore, regardless of the limitation of the buttock line of the ship 1, it is possible to arrange the engine device 21 as close as possible to the stern side, contributing to the compactification of the engine room 11.

A propeller shaft 9 is provided on the downstream side of the power transmission of the speed reducer 22. The outer shape of the speed reducer 22 protrudes downward than the engine device 21 and the shaft-driven generator 23. To the rear surface side of this protruding portion, the front end side of the propeller shaft 9 is coupled so as to enable power transmission. The engine output shaft 24 and the propeller shaft 9 are coaxially positioned in plan view. The propeller shaft 9 extends in the front/rear length direction of the ship hull 2, while being shifted in the vertical direction from the engine output shaft 24. In this case, the propeller shaft 9 is located at a position lower than the shaft-driven generator 23 and the engine output shaft 24 (axial center line) in side view, and close to the inner bottom plate 16. In other words, the shaft-driven generator 23 and the propeller shaft 9, one of which is disposed upper while the other of which is disposed lower, do not interfere with each other. Therefore, it is possible to make each propulsion/electric power generating mechanism 12 compact.

The constant speed power of the engine device 21 is branched and transmitted from the rear end side of the engine output shaft 24 to the shaft-driven generator 23 and the propeller shaft 9, via the speed reducer 22. A part of the constant speed power of the engine device 21 is reduced by the speed reducer 22 to, for example, a rotational speed of approximately 100 to 120 rotations per minute and is transmitted to the propeller shaft 9. The propeller 5 is driven and rotates with the reduced power from the speed reducer 22. As the propeller 5, a variable-pitch propeller capable of adjusting the ship speed through changing the blade angles of the propeller blades is adopted. A part of the constant speed power of the engine device 21 is increased by the speed reducer 22 to, for example, a rotational speed of approximately 1200 to 1800 rotations per minute and is transmitted to a PTO shaft pivotally and rotatably supported by the speed reducer 22. The rear end side of the PTO shaft of the speed reducer 22 is connected to the shaft-driven generator 23 in such manner as to be capable of transmitting the power, and the shaft-driven generator 23 is driven to generate electric power based on the rotary power from the speed reducer 22. Generated electric power by the shaft-driven generator 23 is supplied to an electric system in the ship hull 2.

To the engine device 21, an air-intake path (not shown) for taking in the air and an exhaust path (not shown) for outputting exhaust gas are connected. The air taken in through the air-intake path is fed into cylinders 36 (see FIG. 4) of the engine device 21. Further, since there are two engine devices 21, there are two exhaust paths. Each exhaust path is connected to an extension path (not shown). The extension path extends to the funnel 4, and is structured to be directly in communication with the outside. The exhaust gas from the engine device 21 is emitted outside the ship 1 through the exhaust path and the extension path.

As should be understood from the above description, there is a pair of propulsion/electric power generating mechanisms 12 each of which is a combination of the engine device 21, the speed reducer 22 configured to transmit power from the engine device 21 to the propeller shaft 9 which drives and rotates propeller 5 for propelling the ship, and the shaft-driven generator 23 configured to generate electric power with the power from the engine device 21. The pair of propulsion/electric power generating mechanisms 12 are arranged in the engine room 11 of the ship hull 2 such that one of them is disposed on the left side and the other of them is disposed on the right side of the ship hull center line CL. Therefore, the space for setting up in the engine room 11 can be downsized as compared with a traditional structure in which a plurality of engines (main engine and auxiliary engine) are arranged in an engine room. Therefore, the engine room 11 can be structured compact by shortening the front/rear length of the engine room 11, which in turn facilitates ensuring a hold space (space other than the engine room 11) in the ship hull 2. Two propellers 5 for driving can improve the propulsion efficiency of the ship 1.

Since there are two engine devices 21 which are each a main engine, for example, even when one of the engine devices 21 brakes down and cannot be driven, the other one of the engine devices 21 enables the navigation, and it is possible to obtain redundancy in the motor device of the ship and in turn the ship 1. Further, as is hereinabove mentioned, rotation drive of the propellers 5 and the drive of the shaft-driven generator 23 are possible with the engine devices 21, one of the shaft-driven generators 23 can be reserved as a spare during an ordinary cruise. Therefore, for example, if one engine device 21 or one shaft-driven generator 23 breaks down thus shutting down electric power supply, the power supply can be recovered by activating the other shaft-driven generator 23 and establishing the frequency and the voltage. Further, if the engine device 21 stops during the cruise with only that one engine device 21, the power supply can be recovered by activating the other engine device 21 and in turn, the shaft-driven generator 23 corresponding to the other engine device 21 and establishing the frequency and the voltage.

Figure 3:
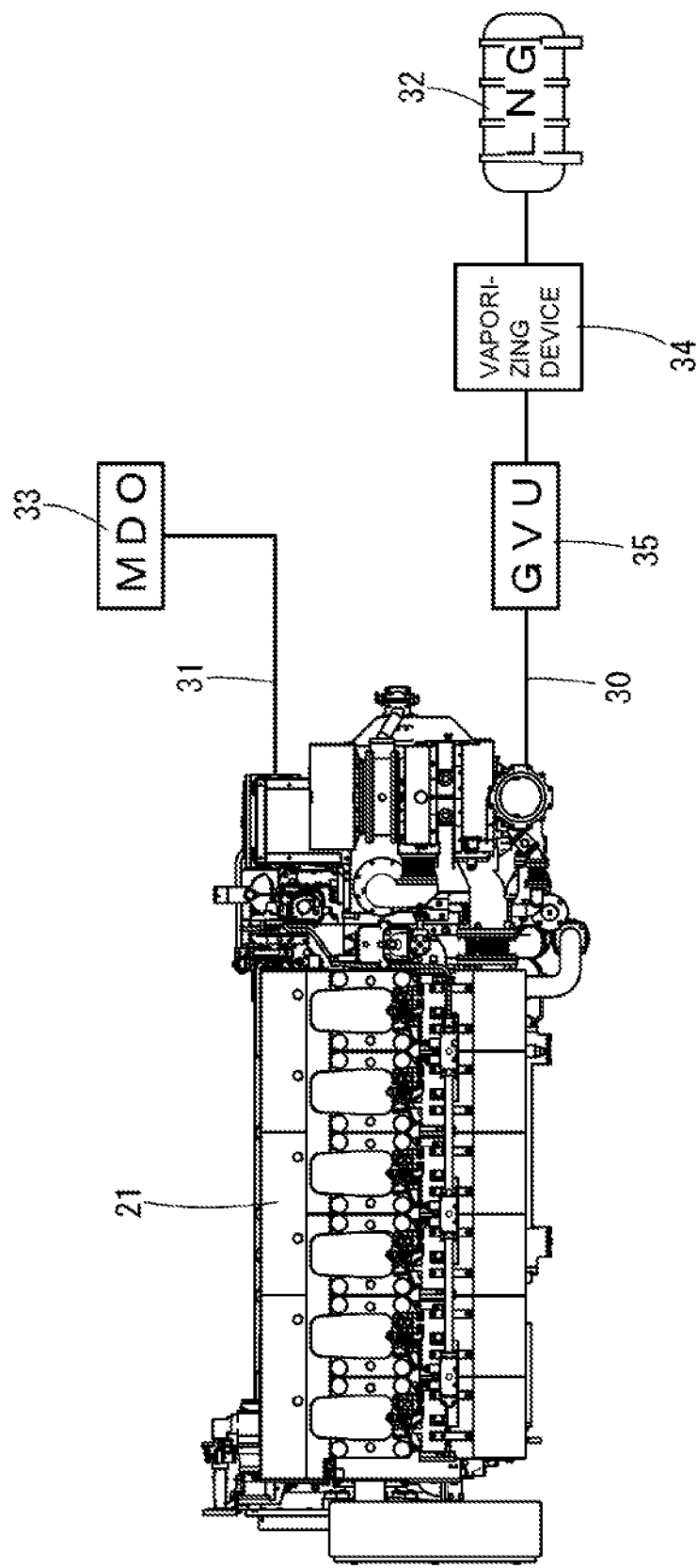
FIG. 3 A schematic view showing a structure of a fuel supply path of an engine device in the embodiment of the present invention.
Figure 4:
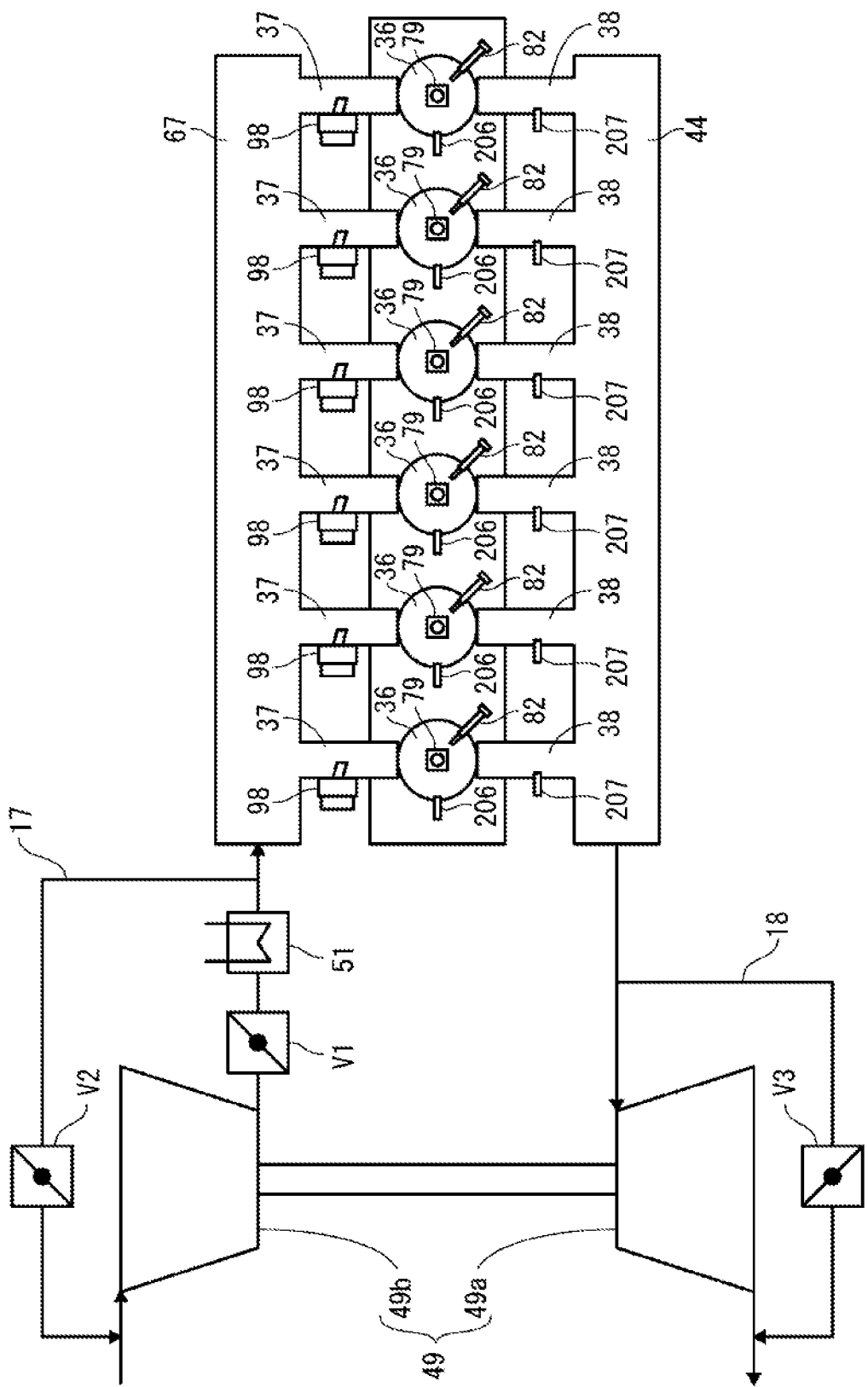
FIG. 4 A schematic view illustrating a structure of an air-intake/exhaust passage in the engine device.
Figure 5:
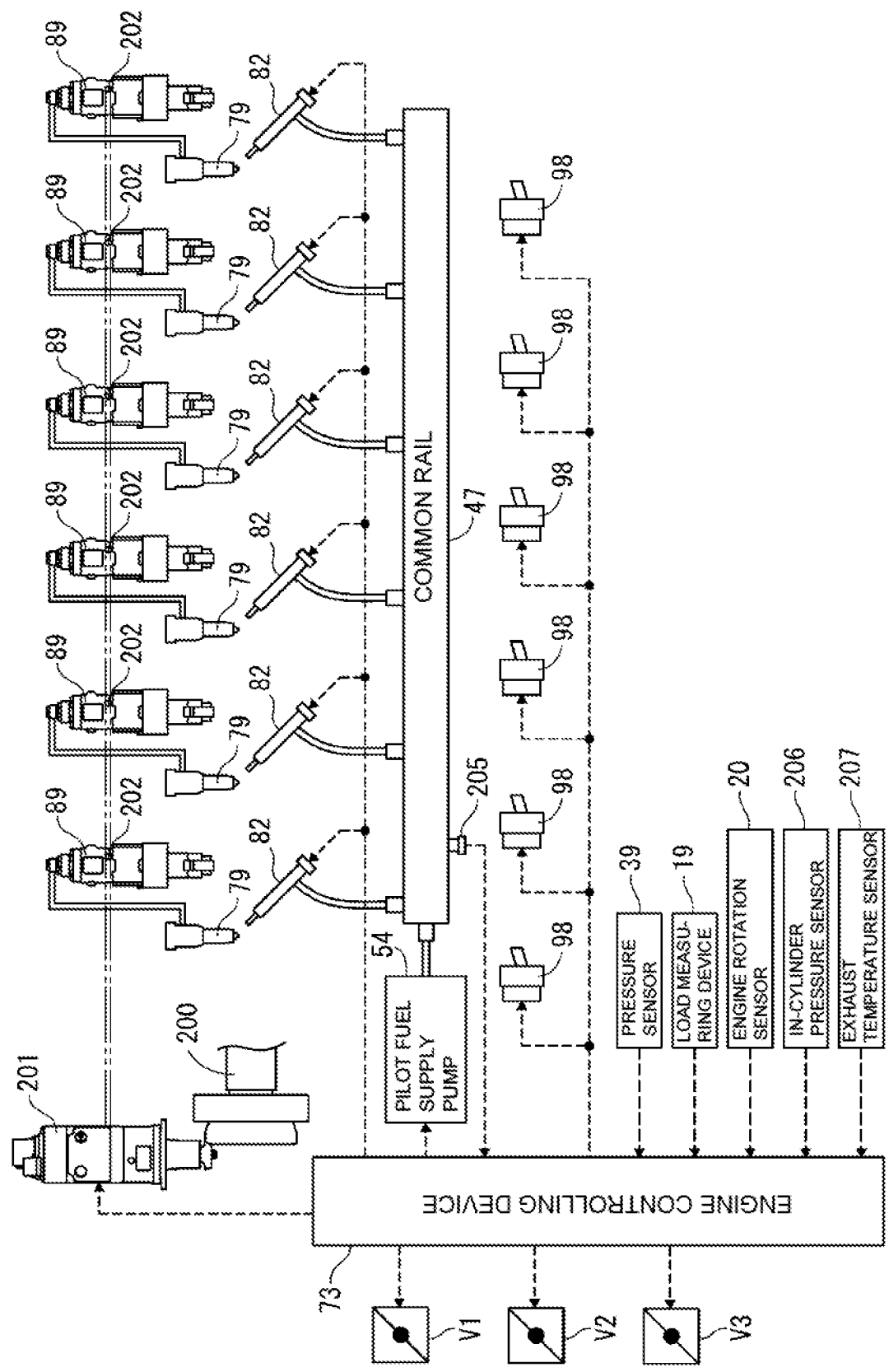
FIG. 5 A control block diagram of the engine device.

Next, the following describes, with reference to FIG. 3 to FIG. 5, a schematic structure of the dual-fuel engine 21 used as the main engine in the above-described ship 1. The dual-fuel engine 21 (hereinafter, simply referred to as "engine device 21") is selectively driven in one of: a premix combustion mode in which fuel gas such as natural gas is mixed with the air and combusted; and a diffusion combustion mode in which a liquid fuel (fuel oil) such as heavy oil is diffused and combusted. FIG. 3 is a diagram showing a fuel system of the engine device 21. FIG. 4 is a diagram showing an air-intake/exhaust system of the engine device 21. FIG. 5 is a control block diagram of the engine device 21.

As shown in FIG. 3, the engine device 21 is such that fuel is supplied from two systems of fuel supply paths 30, 31, and one of the fuel supply paths 30 is connected to a gas fuel tank 32, while the other one of the fuel supply paths 31 is connected to a liquid fuel tank 33. That is, the engine device 21 is structured so that the fuel gas is supplied from the fuel supply path 30 to the engine device 21, and that fuel oil is supplied to the engine device 21 from the fuel supply path 31. The fuel supply path 30 includes: a gas fuel tank 32 configured to store liquefied gaseous fuel; a vaporizing device 34 configured to vaporize the liquefied fuel (fuel gas) in the gas fuel tank 32; and a gas valve unit 35 configured to adjust a fuel gas supply amount from the vaporizing device 34 to the engine device 21. That is, in the structure of the fuel supply path 30, the vaporizing device 34 and the gas valve unit 35 are arranged in this order from the gas fuel tank 32 towards the engine device 21.

As shown in FIG. 4, the engine device 21 has a structure in which a plurality of cylinders 36 (six cylinders in the present embodiment) are serially aligned in a cylinder block. Each cylinder 36 is in communication with an air-intake manifold (air-intake passage) 67 structured in the cylinder block, through an air-intake port 37. Each cylinder 36 is in communication with an exhaust manifold (exhaust gas passage) 44 arranged above the cylinder heads, through an exhaust port 38. To the air-intake port 37 of each cylinder 36, a gas supply device 98 is arranged. Therefore, while the air from the air-intake manifold 67 is supplied to each cylinder 36 through the air-intake port 37, the exhaust gas from each cylinder 36 is ejected to the exhaust manifold 44 through the exhaust port 38. Further, while the engine device 21 is operated in the premix combustion mode, the fuel gas is supplied from the gas supply device 98 to the air-intake port 37. The fuel gas is then mixed with the air from the air-intake manifold 67, and a premixed gas is supplied to each cylinder 36.

An exhaust gas outlet side of the exhaust manifold 44 is connected to an exhaust gas inlet of a turbine 49*a* of a turbocharger 49. An air inlet side (fresh air inlet side) of the air-intake manifold 67 is connected to an air ejection port (fresh air outlet) of an intercooler 51. An air inlet port (fresh air inlet) of the intercooler 51 is connected to the air ejection port (fresh air outlet) of a compressor 49*b* of the turbocharger 49. Between the compressor 49*b* and the intercooler 51, a main throttle valve V1 is arranged. By adjusting the valve opening degree of the main throttle valve V1, the flow rate of air to be supplied to the air-intake manifold 67 is adjusted.

A supplied-air bypass passage 17 configured to circulate a part of the air exhausted from the outlet of the compressor 49b to the inlet of the compressor 49b connects the air inlet (fresh air inlet) side of the compressor 49b with the air outlet side of the intercooler 51. That is, the supplied-air bypass passage 17 is opened to the outside air on the upstream side of the air inlet port of the compressor 49b, while being connected to a connection part of the intercooler 51 and the air-intake manifold 67. On this supplied-air bypass passage 17, a supplied-air bypass valve V2 is arranged. By adjusting the valve opening degree of the supplied-air bypass valve V2, the flow rate of air from the downstream side of the intercooler 51 to the air-intake manifold 67 is adjusted.

The exhaust bypass passage 18 which bypasses the turbine 49a connects the exhaust gas outlet side of the turbine 49a and the exhaust gas outlet side of the exhaust manifold 44. That is, the exhaust bypass passage 18 is opened to the outside air on the downstream side of the exhaust gas outlet of the turbine 49a, while being connected to a connection part of the exhaust gas outlet of the turbine 49a and the exhaust gas inlet of the turbine 49a. On this exhaust bypass passage 18, an exhaust bypass valve V3 is arranged. By adjusting the valve opening degree of the exhaust bypass valve V3, the exhaust gas flow rate flowing in the turbine 49a is adjusted, to adjust the air compression amount in the compressor 49b.

The engine device 21 includes: a turbocharger 49 configured to compress the air by the exhaust gas from the exhaust manifold 44; and an intercooler 51 configured to cool compressed air compressed by the turbocharger 49 and supply the compressed air to the air-intake manifold 67. In the engine device 21, the main throttle valve V1 is provided at the connecting portion between the outlet of the turbocharger 49 and the inlet of the intercooler 51. The engine device 21 includes an exhaust bypass passage 18 connecting an outlet of the exhaust manifold 44 and an exhaust gas outlet of the turbocharger 49, and an exhaust bypass valve V3 is arranged in the exhaust bypass passage 18. In cases of optimizing the turbocharger 49 for a diffusion combustion mode specification, an air-fuel ratio suitable for an engine load is achieved even in the premix combustion mode, by controlling the opening degree of the exhaust bypass valve V3 according to fluctuation in the engine load. Therefore, shortage and surplus in the air amount necessary for combustion can be avoided at a time of load fluctuation, and the engine device 21 is suitably operated in the premix combustion mode, even if the turbocharger 49 optimized for the diffusion combustion mode is used.

The engine device 21 includes the supplied-air bypass passage 17 configured to bypass the turbocharger 49, and the supplied-air bypass valve V2 is arranged in the supplied-air bypass passage 17. By controlling the opening degree of the supplied-air bypass valve V2 according to fluctuation in the engine load, air that matches with the air-fuel ratio required for combustion of the fuel gas can be supplied to the engine. Further, by performing in combination a control operation with the supplied-air bypass valve V2 with a good responsiveness, the response speed to the load fluctuation during the premix combustion mode can be accelerated.

In the engine device 21, the supplied-air bypass passage 17 is connected in a position between the inlet of the intercooler 51 and the main throttle valve V1, and the compressed air ejected from the compressor 49b is circulated to the inlet of the compressor 49b. This way, the responsiveness of the flow rate control with the exhaust bypass valve V3 is compensated by the supplied-air bypass valve V2, and the control band of the supplied-air bypass valve V2 is compensated by the exhaust bypass valve V3. Therefore, the followability of the air-fuel ratio control during the premix combustion mode can be made favorable, when the load fluctuation takes place or at a time of switching the operation mode in a shipboard application.

As shown in FIG. 5, the engine device 21 has an engine controlling device 73 configured to control each part of the engine device 21. In the engine device 21, a pilot injection device 82, a fuel injection pump 89, and a gas supply device 98 are provided for each cylinder 36. The engine controlling device 73 provides control signals to the pilot injection device 82, the fuel injection pump 89, and the gas supply device 98 to control injection of pilot fuel by the pilot injection device 82, fuel oil supply by the fuel injection pump 89, and gaseous fuel supply by the gas supply device 98. The engine controlling device 73 includes, in addition to a CPU (Central Processing Unit) for executing various arithmetic processing and control, a ROM (Read Only Memory) serving as a storage device for storing control programs and data, a RAM (Random Access Memory) for temporarily storing the control programs and data, an input/output interface, and the like.

As shown in FIG. 5, the engine device 21 includes a camshaft 200 having, for each cylinder 36, an exhaust cam, an air-intake cam, and a fuel cam (not shown). The camshaft 200 rotates the exhaust cam, the air-intake cam, and the fuel cam with rotary power transmitted from the engine output shaft 24 through a gear mechanism (not shown) to open and close the air-intake valve and the exhaust valve (not shown) of each cylinder 36 and to drive the fuel injection pump 89. The engine device 21 includes a speed adjuster 201 configured to adjust a rack position of a control rack 202 in the fuel injection pump 89. The speed adjuster 201 measures the engine speed of the engine device 21 based on the rotation number of the leading end of the camshaft 200, to set the rack position of the control rack 202 in the fuel injection pump 89, thereby adjusting the fuel injection amount.

Each pilot injection device 82 is connected to a pilot fuel supply pump 54 through a cylindrical common rail 47. A fuel pressure sensor 205 that detects a fuel pressure in the common rail 47 is provided in the common rail 47. The control by the engine controlling device 73 pressure-feeds the fuel in the liquid fuel tank 33 (see FIG. 3) by the pilot fuel supply pump 54 to the common rail 47, while monitoring the fuel pressure in the common rail 47 based on the output of the fuel pressure sensor 205 and adjusting the fuel ejection amount of the pilot fuel supply pump 54. Hence a high-pressure fuel is stored in the common rail 47. By controlling the opening/closing of the control valve of each pilot injection device 82, the high-pressure fuel in the common rail 47 is injected from the pilot injection device 82 to the corresponding cylinder 36.

The engine controlling device 73 provides control signals to the main throttle valve V1 and the supplied-air bypass valve V2, and the exhaust bypass valve V3 to adjust their valve opening degrees, thereby adjusting the air pressure (air-intake manifold pressure) in the air-intake manifold 67. The engine controlling device 73 detects the air-intake manifold pressure based on a measurement signal from the pressure sensor 39 configured to measure the air pressure in the air-intake manifold 67. The engine controlling device 73 calculates the load imposed to the engine device 21, based on a measurement signal from a load measuring device 19 such as a watt transducer or a torque sensor. The engine controlling device 73 detects the engine speed of the engine device 21, based on a measurement signal from an engine rotation sensor 20 such as a pulse sensor configured to measure the rotation number of the engine output shaft 24.

As shown in FIG. 4 and FIG. 5, the engine device 21 has, for each of the cylinder 36, an in-cylinder pressure sensor 206 configured to detect the internal pressure of the corresponding cylinder 36. Further, for each exhaust port 38, an exhaust temperature sensor 207 configured to detect the exhaust gas temperature in the exhaust port 38 is provided. Outputs of each in-cylinder pressure sensor 206 and each exhaust temperature sensor 207 are input to the engine control device 73.

When the engine device 21 is operated in the diffusion combustion mode (diesel mode), the engine controlling device 73 controls opening and closing of the control valve in the fuel injection pump 89, and causes combustion in each cylinder 36 at a predetermined timing. That is, by opening the control valve of the fuel injection pump 89 according to an injection timing of each cylinder 36, the fuel oil is injected into the cylinder 36 through the main injection device 79, and ignited in the cylinder 36. Further, in the diffusion combustion mode, the engine controlling device 73 stops supply of the pilot fuel and the fuel gas. The fuel oil may be injected from the pilot injection device 82 during the diffusion combustion mode.

In the diffusion combustion mode, the engine controlling device 73 performs feedback control for an injection timing of the main injection device 79 in the cylinder 36, based on the engine load (engine output) measured by the load measuring device 19 and the engine speed measured by the engine rotation sensor 20. This way, the engine device 21 outputs an engine load needed by propulsion/electric power generating mechanism 12 and rotates at an engine speed according to the propulsion speed of the ship. Further, the engine controlling device 73 controls the opening degree of the main throttle valve V1 based on the air-intake manifold pressure measured by the pressure sensor 39, so as to supply compressed air from the turbocharger 49 to the air-intake manifold 67, at an air flow rate according to the required engine output.

While the engine device 21 is operated in the premix combustion mode (gas mode), the engine controlling device 73 adjusts the valve opening degree in the gas supply device 98 to set the flow rate of fuel gas supplied to each cylinder 36. Then, the engine controlling device 73 controls opening and closing of the pilot injection device 82 to cause combustion in each cylinder 36 at a predetermined timing. That is, the gas supply device 98 supplies the fuel gas to the air-intake port 37, at a flow rate based on the valve opening degree, mixes the fuel gas with the air from the air-intake manifold 67, and supplies the premixed fuel to the cylinder 36. Then, the control valve of the pilot injection device 82 is opened according to the injection timing of each cylinder 36, thereby generating an ignition source by the pilot fuel and ignites in the cylinder 36 to which the premixed gas has been supplied. Further, in the premix combustion mode, the engine controlling device 73 stops supply of the fuel oil by the main injection device 79.

In the premix combustion mode, the engine controlling device 73 performs feedback control for the fuel gas flow rate by the gas supply device 98 and for an injection timing of the pilot injection device 82 in each cylinder 36, based on the engine load measured by the load measuring device 19 and the engine speed measured by the engine rotation sensor 20. Further, the engine controlling device 73 adjusts the opening degrees of the main throttle valve V1, the supplied-air bypass valve V2, and the exhaust bypass valve V3, based on the air-intake manifold pressure measured by the pressure sensor 39. This way, the air-intake manifold pressure can be adjusted to a pressure according to the required engine output, and the air-fuel ratio of the fuel gas supplied from the gas supply device 98 can be adjusted to a value according to the engine output.

Figure 6:
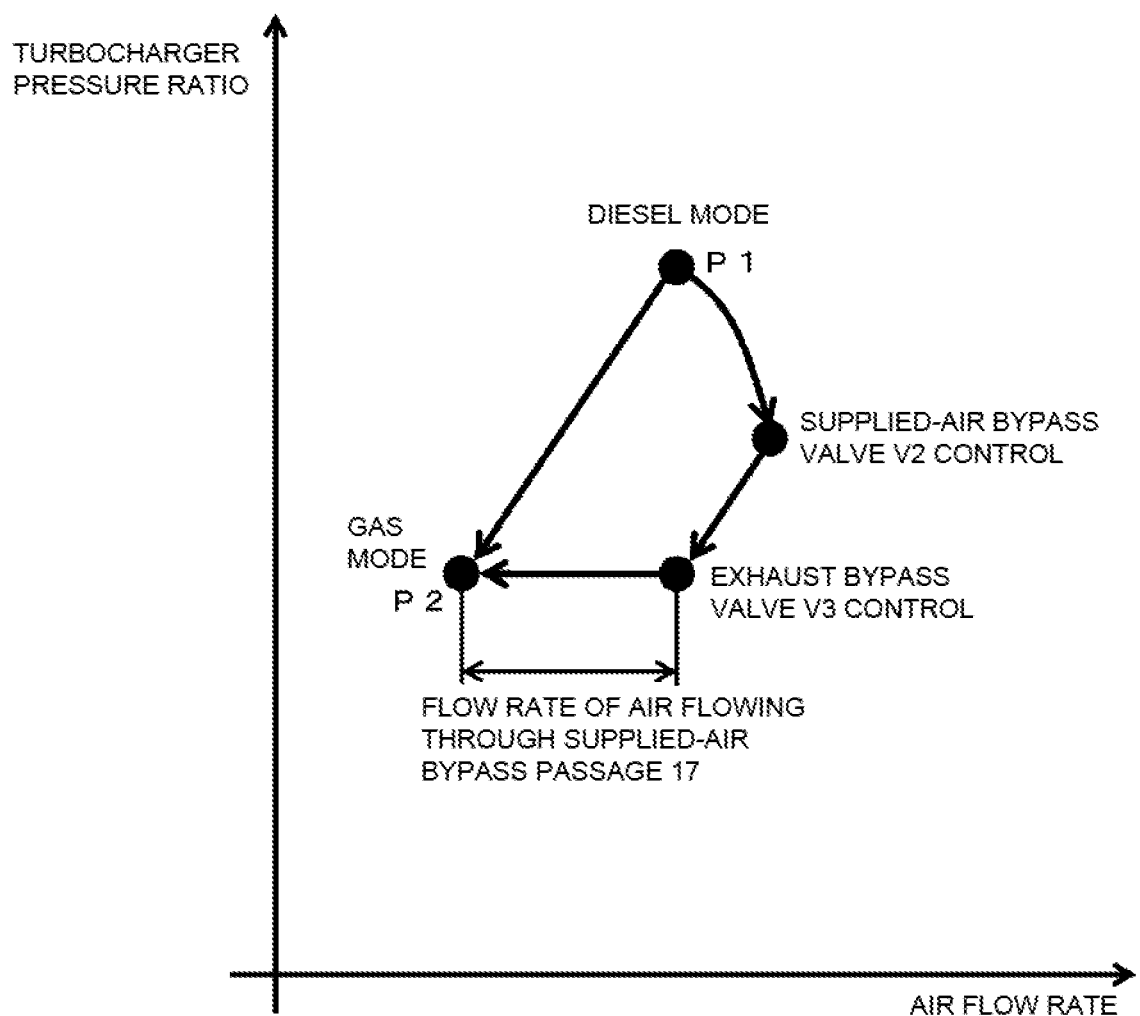
FIG. 6 A diagram showing a relation between a turbocharger pressure ratio and an air flow rate in the engine device.

The turbocharger 49 has a capacity which corresponds to the engine device 21 during an operation in the diffusion combustion mode. Therefore, when the engine device 21 is operated in the premix combustion mode, the capacity of the turbocharger 49 needs to pseudo-correspond to the engine device 21 during an operation in the premix combustion mode. FIG. 6 shows the relationship between the pressure ratio (the ratio of the discharge pressure and the suction pressure of the compressor 49b) in the turbocharger 49 and the air flow rate (the discharge flow rate of the compressor 49b or the flow rate of the air supplied to the air-intake manifold 67). As shown in FIG. 6, where the engine load is supposed to be the same, the compression ratio and the air flow rate at an operation point P2 in the premix combustion mode are lower than those at an operation point P1 in the diffusion combustion mode, respectively.

To change the operation point by controlling only the exhaust bypass valve V3, at a time when the engine device 21 switches its operation from the diffusion combustion mode to the premix combustion mode, the exhaust bypass valve V3 is opened. This lowers the rotation speed of the turbine 49a and lowers the compression ratio and the air flow rate of the compressor 49b. In this case, as shown in FIG. 6, the vector amount of the driving points P1 and P2 in each of the diffusion combustion mode and the premix combustion mode is large, which requires time for switching to the operation point of the premix combustion mode.

On the other hand, in cases of changing the operating point by controlling both the supplied-air bypass valve V2 and the exhaust bypass valve V3, the supplied-air bypass valve V2 is opened to bypass the compressed air discharged from the compressor 49b to the inlet port of the compressor 49b through the supplied-air bypass passage 17, and the exhaust bypass valve V3 is opened at the same time to lower the rotational speed of the turbine 49a. In other words, the compression ratio of the compressor 49b is lowered as shown in FIG. 6, by feeding back the compressed air from the ejection port to the inlet port of the compressor 49b through the supplied-air bypass passage 17. Therefore, the amount of decrease in the compression ratio of the compressor 49b through the control of the exhaust bypass valve V3 can be reduced, and the time taken for switching to the operation point of the premix combustion mode can be shortened.

Figure 7:
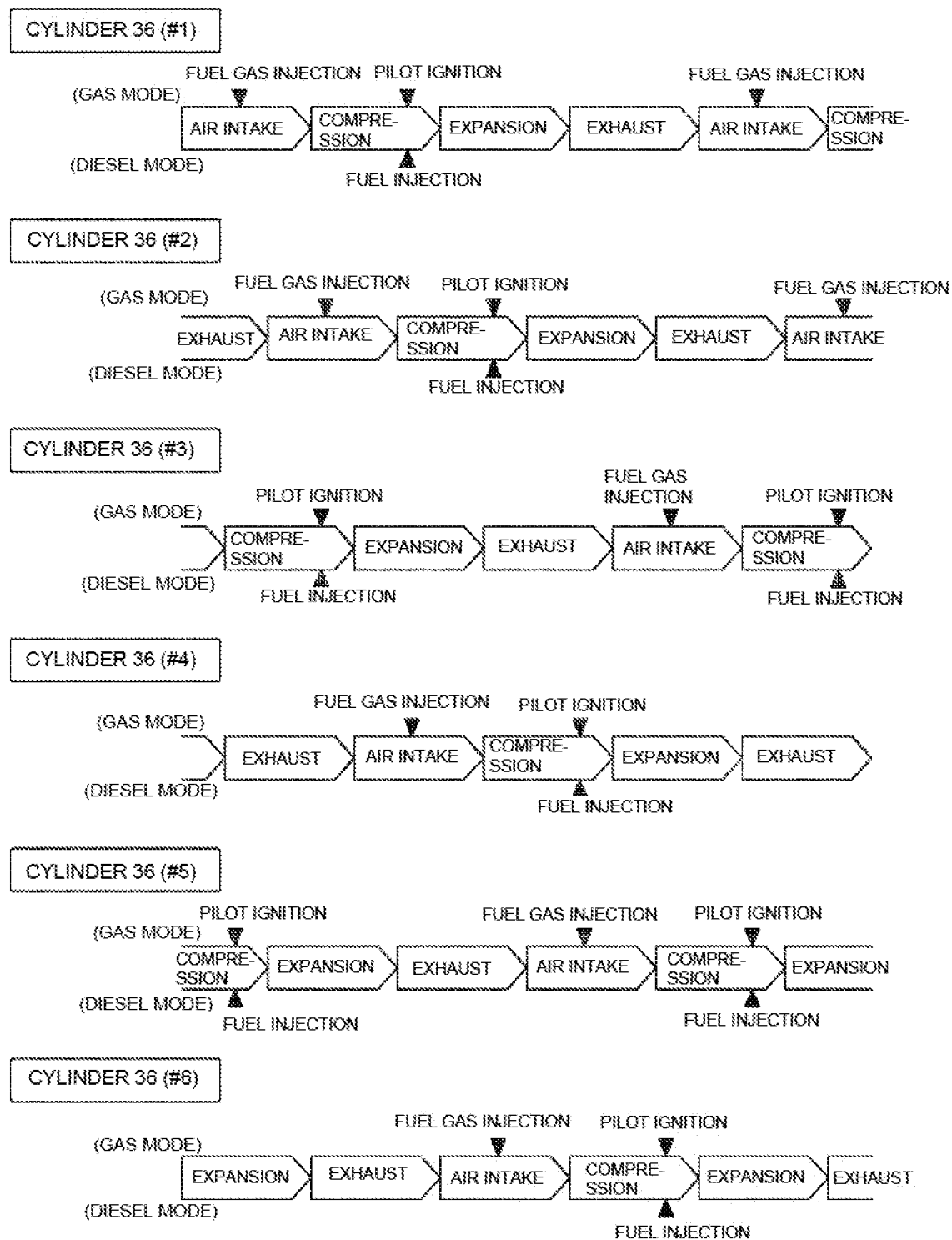
FIG. 7 A state transition diagram showing operation states of each cylinder in the engine device structured by six cylinders.

As shown in FIG. 4, the engine device 21 of the present embodiment includes six cylinders 36. The state of each cylinder 36 transits in an order of the air intake stroke, the compressing stroke, the expansion stroke, and the exhaust stroke shown in FIG. 7, at timings determined for each cylinder 36. That is, state transitions to each of the air intake stroke, the compressing stroke, the expansion stroke, and the exhaust stroke sequentially take place in the six cylinders 36 (#1 to #6), in an order of #1→#2→#4→#6→#5→#3, as shown in FIG. 7. Thus, while the engine device 21 operates in the premix combustion mode (gas mode), fuel gas injection from the gas supply device 98 in the air intake stroke and ignition by the pilot injection device 82 in the compressing stroke are performed in an order of #1→#2→#4→#6→#5→#3. Similarly, while the engine device 21 operates in the diffusion combustion mode (diesel mode), fuel oil injection from the main injection device 79 in the compressing stroke is performed in an order of #1→#2→#4→#6→#5→#3.

Figure 8:
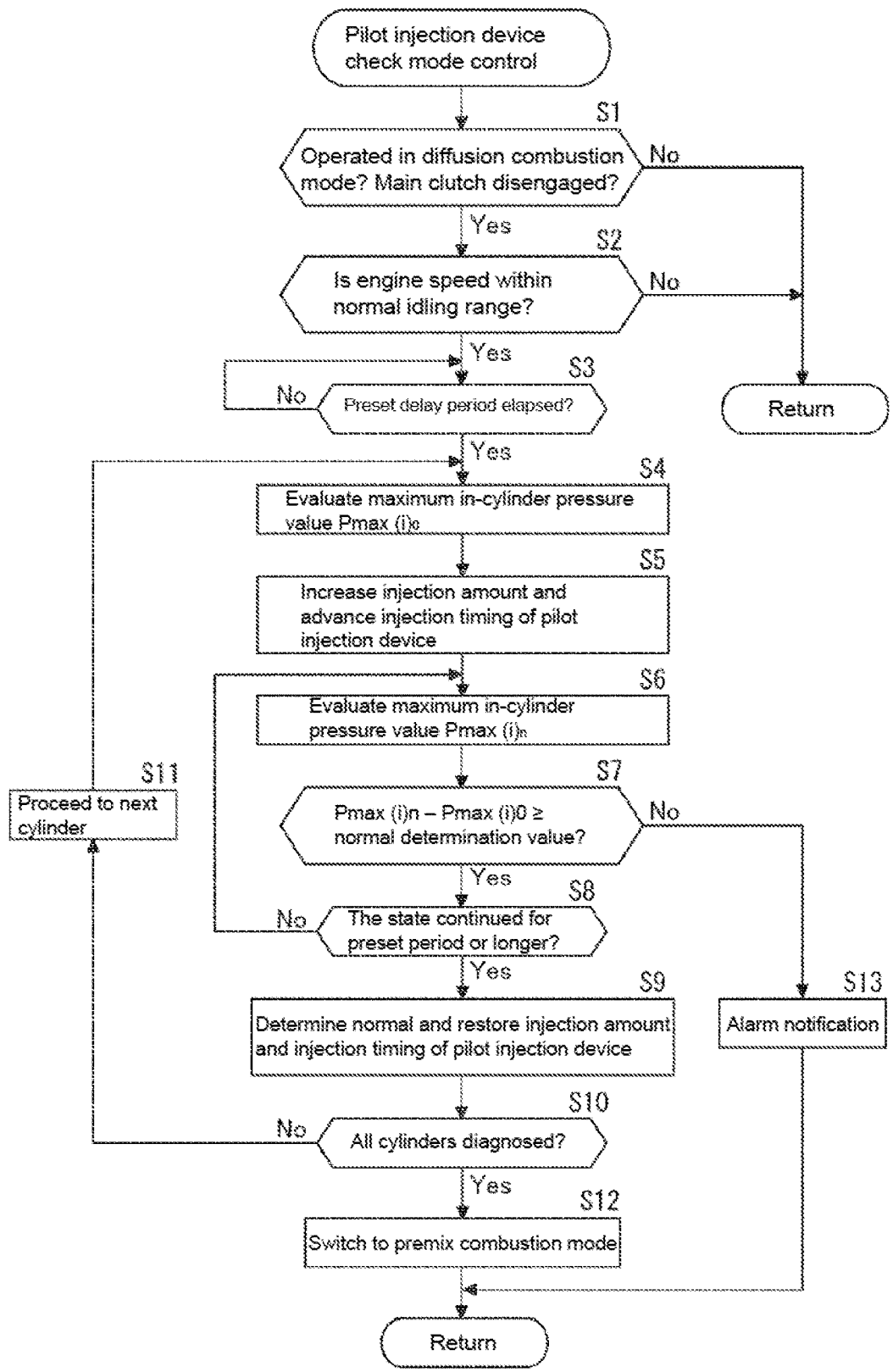
FIG. 8 A flowchart showing a flow of an embodiment of a pilot injection device check mode control.

Next, with reference to FIG. 8, the following describes control performed when the operation of the engine device 21 operating in the diffusion combustion mode is switched to the premix combustion mode. FIG. 8 is a flowchart showing a flow of an embodiment of a pilot injection device check mode control.

The engine controlling device 73 confirms whether or not the engine device 21 is operating in the diffusion combustion mode and the main clutch that transmits the power of the engine device 21 is in the disengaged state, i.e., confirms whether or not the check mode precondition is satisfied (step S1). If the precondition is satisfied (step S1: Yes), whether or not the engine speed of the engine device 21 is within the normal idling range is determined (step S2). For example, the lower limit of the normal idling range is about 350 rpm and the upper limit is about 450 rpm.

If the engine speed of the engine device 21 is within the normal idling range (step S2: Yes), for example, after elapse of a set delay period of about several seconds (step S3: Yes), failure diagnosis is performed for each pilot injection device 82 of the six pilot injection devices 82. First, any of the pilot injection devices 82 is subjected to the failure diagnosis. The in-cylinder pressure of the cylinder 36 having the subject pilot injection device 82 is detected by the in-cylinder pressure sensor 206, and the maximum in-cylinder pressure Pmax $(i)_0$ at a time when the engine output shaft 24 rotates at least once is determined (step S4). At this time, the engine device 21 is in an idling state in the diffusion combustion mode. In this embodiment, the pilot injection device 82 in the diffusion combustion mode injects a small amount of fuel at a predetermined injection timing.

The fuel injection amount of the pilot injection device 82 subjected to the failure diagnosis is increased, and the injection timing is advanced (step S5). Here, an increase in the injection amount of the pilot injection device 82 is an increase such that an increase in the maximum in-cylinder pressure due to the increase in the injection amount can be detected, for example, an increase in the maximum in-cylinder pressure by 5 bar or more. In this embodiment, for example, the injection amount of the pilot injection device 82 is increased by increasing the injection period of the pilot injection device 82 and causing continuous injection from the pilot injection device 82. Further, advancing the injection timing of the pilot injection device 82 by 5 degrees for example facilitates an increase in the maximum in-cylinder pressure of the cylinder 36.

The engine controlling device 73 detects, by the in-cylinder pressure sensor 206, the in-cylinder pressure of the cylinder 36 in which the injection amount of the pilot injection device 82 is increased, and evaluates the maximum in-cylinder pressure value Pmax $(i)_n$ at a time when the engine output shaft 24 rotates at least once (step S6). At this time, if the pilot injection device 82 subjected to the failure diagnosis is operating normally, the maximum in-cylinder pressure value Pmax $(i)_n$ in the cylinder 36 is higher than the maximum in-cylinder pressure value Pmax $(i)_0$ at a time of idling state due to an increase in the injection amount and advancement of the injection timing.

The engine controlling device 73 evaluates the pressure difference between the maximum in-cylinder pressure value Pmax $(i)_n$ and the maximum in-cylinder pressure value Pmax $(i)_0$, and determines whether the pressure difference is equal to or greater than a preset normal determination value (e.g., 5 bar) (step S7). When the pressure difference is equal to or greater than the normal determination value (step S7: Yes), the engine controlling device 73 determines whether or not the pressure difference continues to be the normal determination value or greater for a preset period or longer; e.g., about 5 to 20 seconds (step S8). When the preset period has not elapsed (step S8: No), the engine controlling device 73 calculates the maximum in-cylinder pressure Pmax $(i)_n$ and compares the pressure difference with the normal determination value (steps S6 and S7). When the pressure difference continues to be equal to or greater than the normal determination value (step S8: Yes), the engine controlling device 73 determines that the pilot injection device 82 subjected to the failure diagnosis is normally operating, and restores the injection amount and the injection timing of the pilot injection device 82 (step S9).

The engine control device 73 determines whether or not the failure diagnosis of the pilot injection device 82 has been performed for all of the cylinders 36 (step S10). When there is a cylinder 36 yet to be checked (step S10: No), the process proceeds to the failure diagnosis of the next cylinder 36 (step S11), and the failure diagnosis of the pilot injection device 82 is executed for the next cylinder 36 (steps S4 to S9). When the pilot injection devices 82 of all the cylinders 36 are subjected to the failure diagnosis and are determined as to be normally operating (step S10: Yes), the engine controlling device 73 causes the engine device 21 to switch its operation mode to the premix combustion mode (step S12).

When the pressure difference between the maximum in-cylinder pressure value Pmax $(i)_n$ and the maximum in-cylinder pressure value Pmax $(i)_0$ falls short of the normal determination value in any of the pilot injection devices 82 (step S7: No), the engine controlling device 73 determines that the pilot injection device 82 is not normally operating. Then, the engine controlling device 73 issues an alarm that the operation of the pilot injection device 82 is not normal by, for example, sounding an alarm buzzer or the like (step S13), and terminates the failure diagnosis of the pilot injection devices 82. In this case, the operation of the engine device 21 is not switched to the premix combustion mode, and the operation in the diffusion combustion mode is maintained.

As described, the present embodiment includes: an engine device 21 capable of coping with both a premix combustion mode in which premixed fuel obtained by mixing fuel gas with air in advance is supplied into a cylinder 36 and combusted and a diffusion combustion mode in which liquid fuel is injected into the cylinder 36 and combusted; a gas supply device 98 configured to supply the gaseous fuel into the cylinder 36 in the premix combustion mode; a pilot injection device 82 configured to inject the liquid fuel into the cylinder 36 in the premix combustion mode; and a main injection device 79 configured to inject the liquid fuel into the cylinder 36 in the diffusion combustion mode. The liquid fuel is injected from the main injection device 79 and the liquid fuel is injected from the pilot injection device 82 during the diffusion combustion mode, to diagnose failure in the pilot injection device 82. Therefore, failure in the pilot injection device 82 can be diagnosed without a separate special component for the failure diagnosis of the pilot injection device 82.

Further, the present embodiment includes an in-cylinder pressure sensor 206 configured to detect the in-cylinder pressure of the cylinder 36, and is configured so that an injection amount from the pilot injection device 82 is increased at a time of failure diagnosis of the pilot injection device 82. Therefore, a maximum in-cylinder pressure increases due to an increase in the amount of liquid fuel injected into the cylinder 36, while the pilot injection device 82 operates normally, and failure of the pilot injection device 82 can be detected based on a change in the in-cylinder pressure before and after an increase in the injection amount from the pilot injection device 82.

Further, the present embodiment is configured so that the injection timing of the pilot injection device 82 is advanced at a time of failure diagnosis of the pilot injection device 82. Therefore, the maximum in-cylinder pressure easily rises and failure of the pilot injection device 82 can be more reliably diagnosed based on a change in the in-cylinder pressure.

Further, the present embodiment is configured so that the engine device 21 is operated in the diffusion combustion mode without a transition to the premix combustion mode, when failure in the pilot injection device 82 is detected. Therefore, shut down or a drop in the output of the engine device 21 which may be caused by the failure of the pilot injection device 82 can be avoided and the engine device 21 can be safely operated.

Further, the present invention includes a plurality of the cylinders 36, and is configured so that failure in the pilot injection device 82 is diagnosed for each of the cylinders 36. Therefore, which pilot injection device 82 has failed can be identified, and the maintenance performance is improved because, for example, replacing only the failed pilot injection device 82 suffices.

Figure 9:
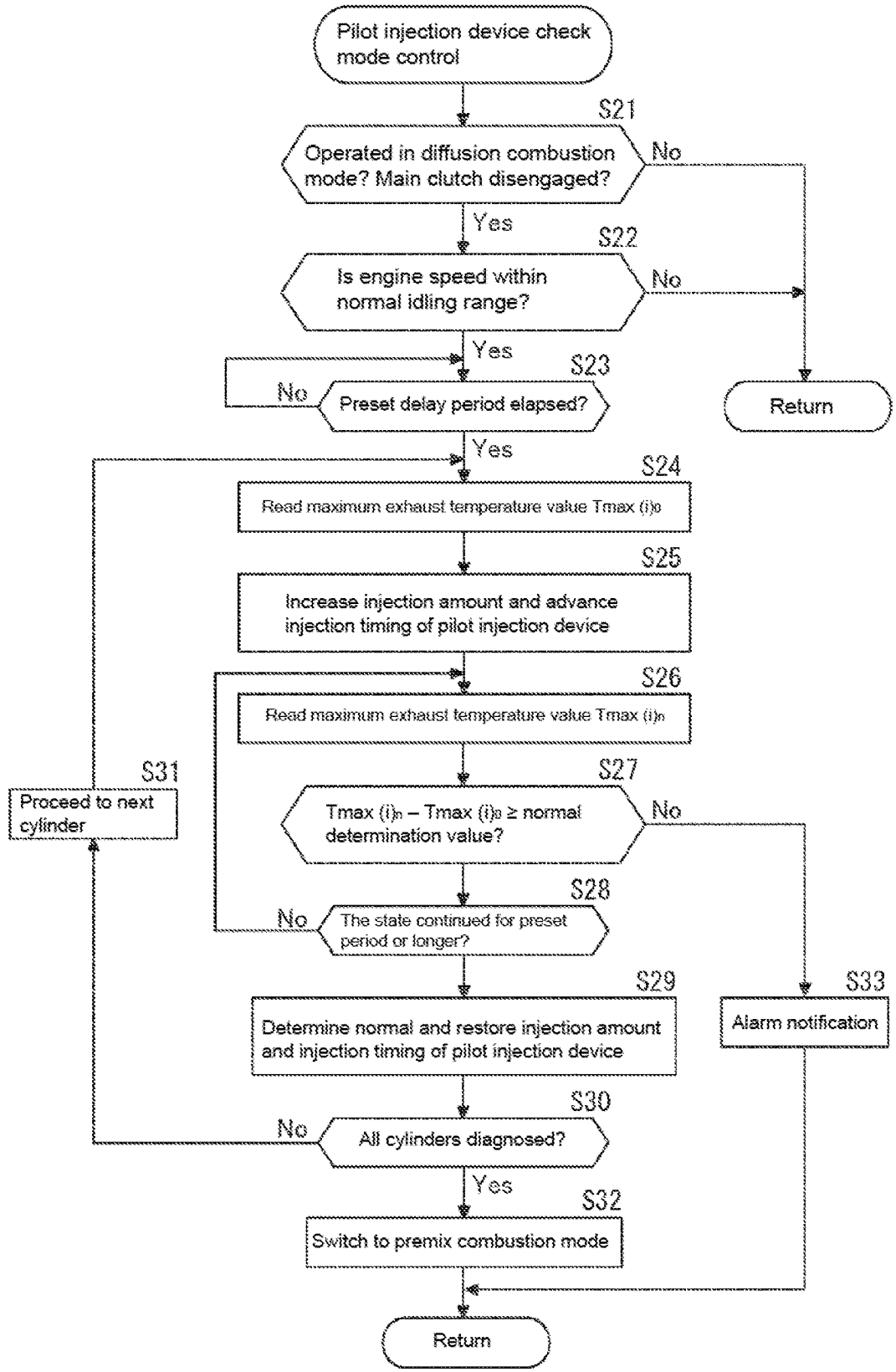
FIG. 9 A flowchart showing a flow of another embodiment of the pilot injection device check mode control.

Next, the following describes a flow of another embodiment of the pilot injection device check mode control, with reference to FIG. 9. In this embodiment, the exhaust gas temperature in the exhaust port 38 is measured for each of the cylinders 36 to diagnose failure in the pilot injection device 82.

As in the above steps S1 to S3, the engine controlling device 73 confirms whether or not the check mode precondition is satisfied (step S21), determines whether or not the engine speed of the engine device 21 is within the normal idling range (step S22), and determines whether or not the set delay period has elapsed (step S23). After elapse of the preset delay period (step S23: Yes), the engine controlling device 73 subjects any of the pilot injection devices 82 to the failure diagnosis, and detects the exhaust gas temperature in the exhaust port 38 connecting to the cylinder 36 having the subject pilot injection device 82, by an exhaust temperature sensor 207. Then, a maximum exhaust temperature value Tmax $(i)_0$ at a time when the engine output shaft 24 rotates at least once is evaluated (step S24).

As in the above step S5, the fuel injection amount of the pilot injection device 82 subjected to the failure diagnosis is increased, and the injection timing is advanced (step S25). Then, the engine controlling device 73 detects, by the exhaust temperature sensor 207, the exhaust gas temperature in the exhaust port 38 connecting to the cylinder 36 in which the injection amount of the pilot injection device 82 is increased, and evaluates the maximum exhaust temperature value Tmax $(i)_n$ at a time when the engine output shaft 24 rotates at least once (step S26). At this time, if the pilot injection device 82 subjected to the failure diagnosis is operating normally, the maximum exhaust temperature value Tmax $(i)_n$ in the exhaust port 38 is higher than the maximum exhaust temperature value Tmax $(i)_0$ at a time of idling state due to an increase in the injection amount and advancement of the injection timing.

The engine controlling device 73 evaluates the temperature difference between the maximum exhaust temperature value Tmax $(i)_n$ and the maximum exhaust temperature value Tmax $(i)_0$, and determines whether the temperature difference is equal to or greater than a preset normal determination value (step S27). When the temperature difference is equal to or greater than the normal determination value (step S27: Yes), the engine controlling device 73 determines whether or not the temperature difference continues to be the normal determination value or greater (step S28), as in the above step S8. When the temperature difference continues to be equal to or greater than the normal determination value for a preset period or longer (step S28: Yes), the engine controlling device 73 determines that the pilot injection device 82 subjected to the failure diagnosis is normally operating, and restores the injection amount and the injection timing of the pilot injection device 82 (step S29).

As in the above steps S10 and S11, when there is a cylinder 36 yet to be checked (step S30: No), the engine controlling device 73 proceeds to the failure diagnosis of the next cylinder 36 (step S11), and executes the failure diagnosis of the pilot injection device 82 successively for the six cylinders 36 (steps S24 to S29). When the normal operations of all the pilot injection devices 82 are detected (step S30: Yes), the engine controlling device 73 causes the engine device 21 to switch its operation mode to the premix combustion mode (step S32). When the temperature difference between the maximum exhaust temperature value Tmax $(i)_0$ and the maximum exhaust temperature value Tmax $(i)_0$ falls short of the normal determination value in any of the pilot injection device 82 (step S27: No), the engine controlling device 73 issues an alarm that the operation of the pilot injection device 82 is not normal (step S33), and terminates the failure diagnosis of the pilot injection devices 82.

As described, the present embodiment includes an exhaust temperature sensor 207 configured to detect the exhaust gas temperature in an exhaust port 38 connecting to the cylinder 36, and is configured so that an injection amount from the pilot injection device 82 is increased at a time of failure diagnosis of the pilot injection device 82. Therefore, a maximum exhaust gas temperature in the exhaust port 38 increases due to an increase in the amount of liquid fuel injected into the cylinder 36, while the pilot injection device 82 operates normally, and failure of the pilot injection device 82 can be detected based on a change in the exhaust gas temperature before and after an increase in the injection amount from the pilot injection device 82.

Figure 10:
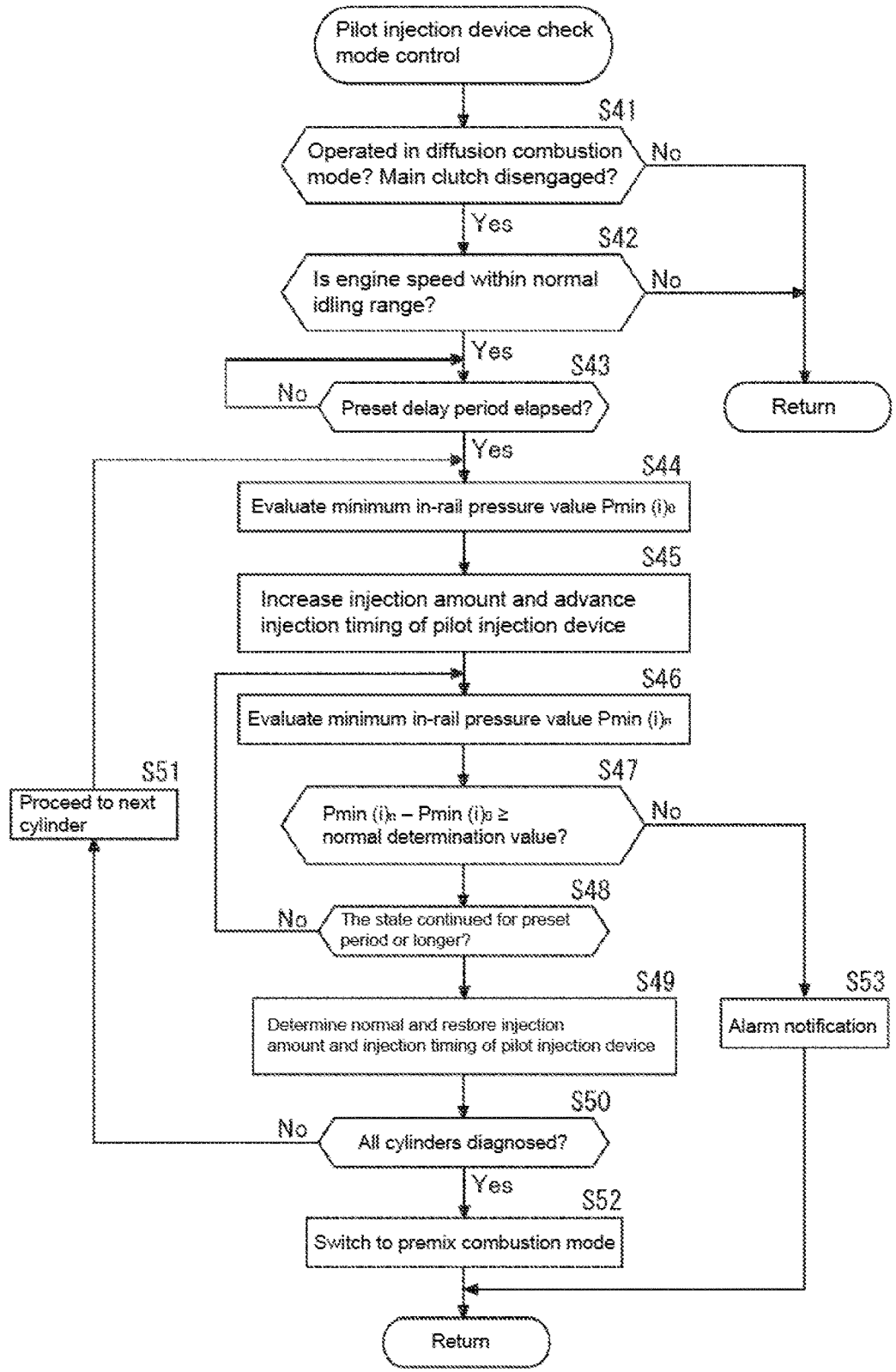
FIG. 10 A flowchart showing a flow of yet another embodiment of the pilot injection device check mode control.

Next, the following describes a flow of yet another embodiment of the pilot injection device check mode control, with reference to FIG. 10. In this embodiment, an injection amount is increased successively for the six pilot injection devices 82, and a change in the in-rail pressure in the common rail 47 is detected to diagnose failure of each pilot injection device 82.

In this embodiment, step S41 to step S43 are the same as step S1 to S3 and S21 to S 23 described above. After elapse of the preset delay period (step S43: Yes), the engine controlling device 73 subjects any of the pilot injection devices 82 to the failure diagnosis, and detects the in-rail pressure in the common rail 47, by a fuel pressure sensor 205. Then, a minimum in-rail pressure value Pmin $(i)_0$ at a time when the engine output shaft 24 rotates at least once is evaluated (step S44).

As in the above step S5, the fuel injection amount of the pilot injection device 82 subjected to the failure diagnosis is increased, and the injection timing is advanced (step S45). Then, the engine controlling device 73 evaluates the minimum in-rail pressure value Pmin $(i)_n$ at a time when the engine output shaft 24 rotates at least once, based on the output from the fuel pressure sensor 205 (step S46). At this time, if the pilot injection device 82 subjected to the failure diagnosis is operating normally, the minimum in-rail pressure value Pmin $(i)_n$ is lower than the minimum in-rail pressure value Pmin $(i)_0$ at a time of idling state due to an increase in the injection amount of the pilot injection device 82.

The engine controlling device 73 evaluates the pressure difference between the minimum in-rail pressure value Pmin $(i)_0$ and the minimum in-rail pressure value Pmin $(i)_n$, and determines whether the pressure difference is equal to or greater than a preset normal determination value (step S47). When the pressure difference continues to be equal to or greater than the normal determination value for a preset period or longer (step S48: Yes), the engine controlling device 73 determines that the pilot injection device 82 subjected to the failure diagnosis is normally operating, and restores the injection amount and the injection timing of the pilot injection device 82 (step S49).

Then, the engine controlling device 73 performs, as appropriate, the step of checking if there is a cylinder 36 yet to be checked (step S50), the step of proceeding to the failure diagnosis of the next cylinder 36 (step S51), the step of switching the operation mode of the engine device 21 to the premix combustion mode (step S52), and the step of issuing an alarm that the pilot injection device 82 is not operating normally (step S33), as in the above described steps S10 to S13.

As described, the present embodiment includes a fuel pressure sensor 205 configured to detect the fuel pressure in the common rail 47, and is configured so that an injection amount from the pilot injection device 82 is increased at a time of failure diagnosis of the pilot injection device 82. Therefore, a minimum in-rail pressure of the common rail 47 decreases due to an increase in the amount of liquid fuel injected into the cylinder 36, while the pilot injection device 82 operates normally, and failure of the pilot injection device 82 can be detected based on a change in the in-rail pressure before and after an increase in the injection amount from the pilot injection device 82.

In each of the embodiments described with reference to FIG. 8 to FIG. 10, the fuel injection amount of the pilot injection device 82 subjected to the failure diagnosis is increased, and the injection timing is advanced, in steps S5, S25, and S45. However, the injection amount may be increased, without advancing the injection timing, as compared to the idling state.

Further, the check mode precondition in steps S1, S21, and S41 may include a condition in addition to (A) the operation mode being in the diffusion combustion mode and (B) the main clutch being disengaged. For example, such a condition may be: (C) a predetermined period having elapsed from the start of the engine device 21; (D) not all the pilot injection devices 82 being determined as to be normal in the failure diagnosis of the pilot injection device 82; (E) the pilot injection device 82 not being blocked; (F) the rail pressure of the common rail 47 being subjected to feedback control (PID control); (G) the water temperature of the water jacket of the engine device 21 being equal to or higher than a predetermined value; (H) the in-cylinder pressure sensor 206 having no abnormality; or (I) the state not being in an emergency state and the like, in which an operation mode should not be in the diffusion combustion mode.

The structure of each of the elements is not limited to those of the illustrated embodiment, but can be variously changed within a scope which does not deflect from the scope of the present invention. Further, the engine device of the present embodiment can also be applied to structures other than the propulsion/electric power generating mechanism described above. For example, the engine device of the present embodiment may be configured as a generator device for supplying electric power to an electric system in a ship hull or as a drive source in a land-based power generating facility.

DESCRIPTION OF THE REFERENCE NUMERAL 21 engine device
36 cylinder
79 main injection device
82 pilot injection device
98 gas supply device
206 in-cylinder pressure sensor

The invention claimed is:

1. An engine device comprising:
   an engine capable of coping with both a premix combustion mode in which premixed fuel obtained by mixing gaseous fuel with air in advance is supplied into a cylinder and combusted and a diffusion combustion mode in which liquid fuel is injected into the cylinder and combusted;
   a gas supply device configured to supply the gaseous fuel into the cylinder in the premix combustion mode;
   a pilot injection device configured to inject the liquid fuel into the cylinder in the premix combustion mode;
   a main injection device configured to inject the liquid fuel into the cylinder in the diffusion combustion mode; and
   wherein the engine device is configured to initiate a failure diagnosis process in the pilot injection device, the pilot injection device configured to inject a liquid fuel while the engine operates in the diffusion combustion mode during the failure diagnosis process, and the failure diagnosis process based on a pressure difference between a first maximum pressure detected in the cylinder and a second maximum pressure detected in the cylinder, the first maximum pressure based on a first amount of the liquid fuel injected from the pilot injection device and the second maximum pressure based on a second amount of the liquid fuel injected from the pilot injection device, the second amount of the liquid fuel greater than the first amount of the liquid fuel.

2. The engine device according to claim 1, wherein:
   an injection amount from the pilot injection device is increased at a time of failure diagnosis of the pilot injection device.

3. The engine device according to claim 2, wherein:
   the pilot injection device in the diffusion combustion mode is configured to inject a small amount of liquid fuel at a predetermined injection timing, and
   an injection timing of the pilot injection device is advanced as compared to an injection timing during an idling state, at a time of failure diagnosis.

4. The engine device according to claim 1, wherein:
   the engine device is operated in the diffusion combustion mode without a transition to the premix combustion mode, when failure in the pilot injection device is detected.

5. The engine device according to claim 1, wherein:
   the cylinder comprises a plurality of cylinders; and
   failure in the pilot injection device is diagnosed for each cylinder of the plurality of cylinders.

6. The engine device according to claim 1, wherein:
the pilot injection device in the diffusion combustion mode is configured to inject the liquid fuel at a predetermined injection timing.

7. An apparatus comprising:
a control device configured to initiate a failure diagnosis process associated with a pilot injection valve based on a pressure difference between a first pressure detected in a cylinder of an engine and a second pressure detected in the cylinder, the first pressure based on a first amount of a liquid fuel injected from the pilot injection valve and the second pressure based on a second amount of the liquid fuel injected from the pilot injection valve, the second amount greater than the first amount; and
wherein the pilot injection valve is configured to inject the liquid fuel while the engine operates in a diffusion combustion mode based on the initiated failure diagnosis process.

8. The apparatus according to claim 7, wherein the control device includes a central processing unit.

9. The apparatus according to claim 7, wherein the control device includes an electronic control unit.

10. The apparatus according to claim 7, wherein:
the control device is configured to:
determine the first pressure;
determine the second pressure; and
compare the first pressure to the second pressure.

11. The apparatus according to claim 7, wherein the control device is configured to compare a difference between the first pressure and the second pressure to a value.

12. The apparatus according to claim 7, wherein the control device is configured to output a signal indicating the pilot injection valve is in a failed state based on a determination that a difference between the first pressure and the second pressure is greater than or equal to a value.

13. The apparatus according to claim 7, wherein the control device is configured to output a signal indicating the pilot injection valve is in a functional state based on a determination that a difference between the first pressure and the second pressure is less than a value.

14. The apparatus according to claim 7, further comprising:
the pilot injection valve; and
wherein the control device is configured to send, based on the initiated failure diagnosis process, a first signal to the pilot injection valve to inject the first amount of the liquid fuel for a first time period.

15. The apparatus according to claim 14, wherein the control device is configured to send, based on the initiated failure diagnosis process and a determination that the pilot injection valve injected the first amount of the liquid fuel for the first time period, a second signal to the pilot injection valve to inject the second amount of the liquid fuel for a second time period.

16. The apparatus according to claim 7, wherein:
the first pressure includes a first maximum pressure detected in the cylinder between injection of the first amount of the liquid fuel and at least one full rotation of an output shaft of the engine; and
the second pressure includes a second maximum pressure detected in the cylinder between the injection of the second amount of the liquid fuel and at least one full rotation of the output shaft of the engine.

17. The apparatus according to claim 7, further comprising:
the pilot injection valve configured to inject a first liquid fuel; and
a main injection valve configured to inject a second liquid fuel; and
wherein:
the engine is configured to operate in a pre-mixed combustion mode;
based on the engine operating in the pre-mixed combustion mode, the cylinder is configured to receive a gaseous fuel and the first liquid fuel via the pilot injection valve; and
based on the engine being configured to operate in the diffusion combustion mode, the cylinder is configured to receive the liquid fuel.

18. A method comprising:
initiating a failure diagnosis process associated with a pilot injection valve based on a pressure difference between a first pressure detected in a cylinder of an engine and a second pressure detected in the cylinder, the first pressure based on a first amount of a liquid fuel injected from the pilot injection valve and the second pressure based on a second amount of the liquid fuel injected from the pilot injection valve, the second amount greater than the first amount; and
injecting, based on initiating the failure diagnosis process, the liquid fuel via the pilot injection valve while the engine operates in a diffusion combustion mode.

19. The method according to claim 18, further comprising:
determining the first pressure in the cylinder; and
determining the second pressure in the cylinder.

20. The method according to claim 18, further comprising outputting a signal indicating the pilot injection valve is in a failed state based on a determination that a difference between the first pressure and the second pressure is greater than or equal to a value.

* * * * *